Patented May 9, 1933

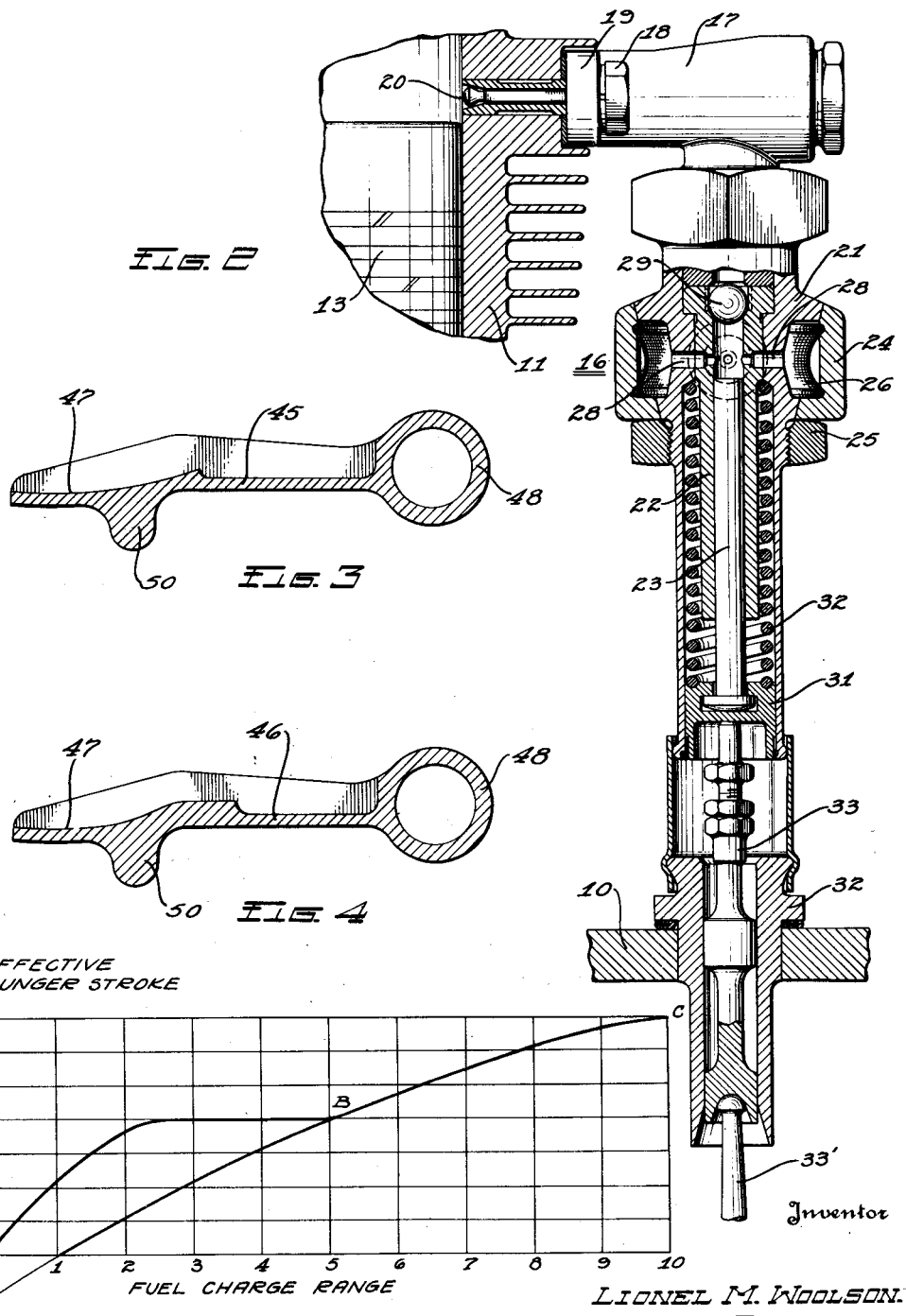

1,907,696

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed September 24, 1929. Serial No. 394,877.

This invention relates to internal combustion engines, and more particularly to fuel feeding mechanism.

The quantity of fluid required for the fuel charge in Diesel engine cylinders, when idling, is very small and considerable difficulty is encountered in maintaining combustion without racing the engine. This is particuarly true with fuel injection devices in which the pump stroke controls the fuel quantity delivery to the cylinders, because when idling the effective stroke is very short and it is found that when air is present in the device, the stroke is ineffective to expel the same and also that there is evacuation of fuel from the pump barrel back into the feed lines. Either of these conditions seriously impairs the proper delivery of fuel required to maintain combustion, and as a result starting is difficult, and when the engine is idling combustion will fail in some or all of the cylinders.

Such conditions are very undesirable, and when exterior air is moved directly into the cylinders for mixture with the fuel, they are even more objectionable because if the exterior temperature is lower than in the cylinders a chilling effect will result. As Diesel engines depend on heat developed by compression, such refrigeration of the cylinders will retard combustion even when the fuel charge delivered is sufficient to cause combustion. Such irregularity of combustion with Diesel engines used to propel airplanes is dangerous because idling of the engine is necessary when gliding, and if the engine stops while in the air, starting cannot be readily accomplished.

An object of the invention is to provide an internal combustion engine of the Diesel type in which the fuel injection system is such that the above undesirable conditions are eliminated.

Another object of the invention is to provide a fuel feeding system of the character set forth by means of which the engine cannot stall when idling due to inadequate fuel charges.

Another object of the invention is to provide a fuel feeding system for internal combustion engines of the pressure ignition type in which a greater quantity of fuel is injected into some of the cylinders than into others when the engine is running at idling speeds so that enough cylinders will always fire to insure continuous operation.

A further object of the invention is to provide an internal combustion engine, of the radial type, having individual fuel feeding mechanisms associated with the cylinders thereof and operated from a single driving member in a manner to insure that some of the cylinders will always receive an adequate quantity of fuel to cause combustion when set to run at idling speed.

A still further object of the invention is to provide a fuel injecting system for a multi-cylinder internal combustion engine in which an equal quantity of fuel will be delivered to all cylinders when the engine is running above a predetermined speed, and which will deliver a quantity of fuel to some of the cylinders to insure combustion therein when the engine is running below the predetermined speed.

These and other objects of the invention will appear from the folowing description taken in connection with the drawings, which form a part of this specification, and in which:

Fig. 2 is a vertical sectional view of a fragmentary portion of the engine and the fuel feeding system, illustrating the pump structure in detail;

Fig. 3 is a vertical sectional view of one of the actuator rock levers for moving the fuel plunger to inject fuel into the cylinder;

Fig. 4 is a vertical sectional view of another actuator rock lever;

Fig. 5 is a diagrammatic view illustrating the relative movement of the two types of actuator rock levers with respect to the effective plunger stroke and the fuel charge adjustment range.

Figure 1:
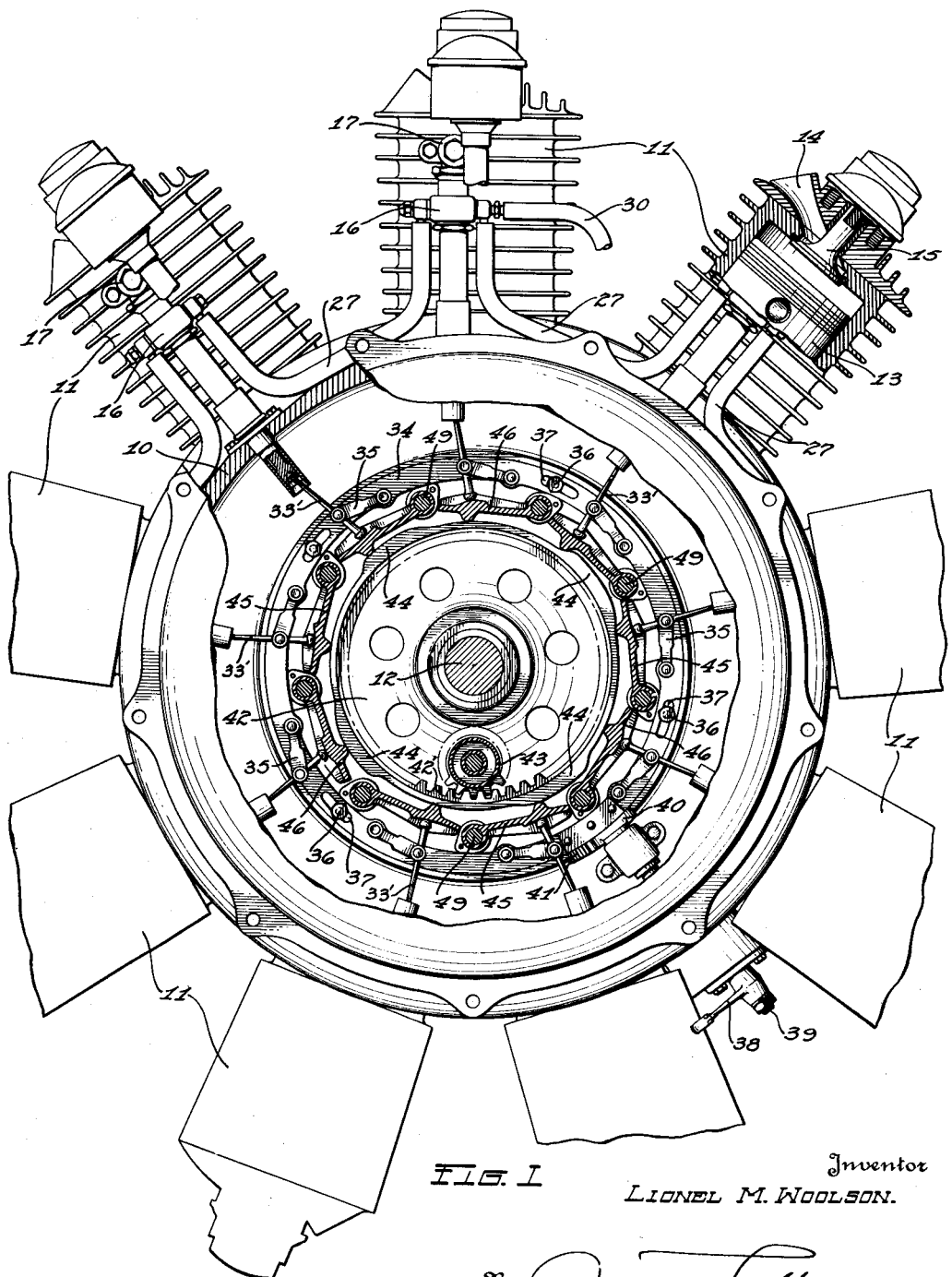
Fig. 1 is an end elevation of an engine incorporating my invention, partially broken away and partially in section.

Referring now to the drawings by characters of reference, 10 represents the casing of an internal combustion engine from which a plurality of cylinders 11 extend radially. The crankshaft 12 extends axially through the engine casing and is connected by rods, in a conventional manner, to be rotated by the reciprocation of the pistons 13.

The cylinders are preferably equally spaced around the periphery of the engine casing and are secured thereto in a manner such that the entire engine casing structure will withstand the high compression pressure which is required to ignite fuel charges within the cylinders.

A passage 14 extends through the head of each cylinder and is arranged to cause an air charge, drawn therethrough by the piston, to move in a spiral direction circumferentially of the cylinder, and each of such passages also serves as the exhaust outlet. A valve 15 is arranged to open and close the inner end of the passages 14 and suitable mechanism, of a conventional type, is provided to actuate such valves so that they will be in open position during the intake and exhaust cycles of the engine operation, it being understood that the engine illustrated is of the four-cycle type. The valve actuating mechanisms can be driven from the crankshaft in a conventional manner.

A fuel injecting device is associated, preferably, with each cylinder, and such devices are of a character whereby atomized liquid fuel is injected under a high pressure into the combustion chambers, which in this instance are the interior of the cylinders.

Each of the fuel injecting devices are similar and consist of a pump portion 16 and an atomizing portion 17, such structures being illustrated as an integral unit which is secured to the cylinder by means of cap screws 18 arranged to clamp flanges 19 of the atomizer section against the wall of the cylinder. The atomizer includes a nozzle valve 20 which is opened inwardly of the cylinder against high spring tension by the pressure of the fluid when the pump is operated to inject a charge of fuel. The pump section includes an outer casing 21 within which is secured a sleeve 22 which forms the pump barrel proper and in which the pump plunger 23 is reciprocated. A union 24 is secured around a portion of the outer casing 21 by a nut 25, and carries a screen 26 through which liquid fuel must pass from the feed line 27 before entering inlet ports 28 provided in the inclosed casing wall and the barrel. The pump plunger is arranged to be reciprocated and in its movement will act as a valve to open or close the fuel inlet ports 28 leading to the interior of the sleeve or pump barrel. In order to prevent the return of fuel from the nozzle section to the barrel, a check valve 29 is provided at the upper end of the pump barrel sleeve.

The fuel feed line consists of a plurality of conduit sections 27 extending intermediate the several unions 24, a suitable communication between one of the sections 27 and a reservoir (not shown) within which means can be arranged for propelling the fluid through the feed line under a low pressure, and an outlet conduit 30 which is associated with the uppermost union for returning excess liquid fuel from the feed line to the reservoir.

Each of the fuel injection pump plungers have associated therewith actuator mechanism, a portion of which extends through the casing 10. A guide member 31 is slidably mounted within the lower portion of the outer pump casing and is fixed to an end of the pump plunger, and a coil spring 32 is arranged between the pump barrel and the outer casing. The ends of the spring engage the guide member and the casing, and serve to return the plunger into port uncovering position after the injection stroke has occurred.

The engine casing includes a bearing member 32 through which an actuator rod 33 extends, such actuator rod engaging the guide member 31 and being itself engaged by the rod 33'. The rod is anchored to an annularly adjustable ring member 34, seated within a circular groove within the engine casing, by means of a link 35, which is pivoted to the actuator rod and to the ring member. The ring member is fixed to the casing by means of studs 36 which pass through arcuate slots 37 therein.

Manually operated mechanism is provided for rotating the ring member, and such adjustment mechanism consists of a lever 38 associated to rotate a shaft 39 which extends through the casing wall and is provided on its inner end with a gear 40 meshing with a toothed plate 41 attached to the ring member. When the shaft 39 is rotated, the gear 40, through its meshing relation with the gear 41, will rotate the ring member in a manner to shift the rods 33' through the link members 35, and thereby change their angle of inclination which in turn will vary the speed and length of the stroke of the associated pump plungers. As each of the rods 33' is connected to the ring and equally spaced relative thereto, adjustment of the ring member will cause an equal adjustment of the rods 33'.

A cam 42 is loosely mounted upon the crankshaft 12 and is provided with internal teeth 42' which are engaged by a gear 43 driven from the crankshaft 12 by gearing (not shown), and arranged so that the cam will be driven in anti-clockwise direction at one-eighth the crank-shaft speed. The cam is provided on its periphery with four lobes 44 which engage actuator rock lever members associated one with each plunger actuating rod 33'. The actuator rock lever members are of two types as indicated by the numerals 45 and 46, such levers being similar in form with the exception of the face 47 upon which the end of the rods 33' bear. The actuator rock levers are provided at one end with an eye 48, which encircles the shafts 49 secured within the casing. It will be seen that when a lobe of the cam member engages with the boss 50 of the actuator rocker levers, that they will be moved to cause the pump plunger to be moved in a direction closing the ports 28, and that the length of the plunger stroke beyond such passages will determine the quantity of fuel which will be forced through the nozzle section into the combustion chamber of the engine cylinders. The faces 47 of the actuator rock levers 45 are so formed that the injection stroke of the pump plunger will be slower as the effective stroke is shortened. As before explained, manipulation of the ring member will change the angle of the rods 33' and consequently, while the period of the plunger movements is always the same, the movement will be faster when the stroke is lengthened and slower when the stroke is shortened.

With the type of fuel injecting device described, the nozzle valve is held substantially closed under tension considerably higher than that at which the liquid fuel is moved into the pump barrel so that when the plunger is in retracted position uncovering the ports 21 the space in the pump and nozzle intermediate the plunger and nozzle valve is filled with liquid. In the injection stroke of the plunger, fluid will be displaced through the ports 28 until they are covered by the plunger, whereupon pressure against the trapped fluid will force the nozzle valve open and a quantity of fluid equal to the displacement of the plunger after closing the ports will be injected into the cylinder. When the plunger stroke beyond the ports is shortened for idling operation of the engine, the time in which it takes the plunger to close the ports will be increased, and I have found that such time element causes evacuation through the ports such that the space between the ports and the nozzle valve 20 is not completely filled, and as a consequence the piston is ineffective when the stroke is only a short distance beyond the inlet ports. Further if any air has collected in the nozzle, injection is thereby hindered under these conditions because enough pressure is not developed in the nozzle to remove the same. This uncertainty of the quantity of the fuel charge will result in cylinders not firing which is objectionable, and will at times stall the engine, and it is the purpose of this invention to overcome this condition sufficiently to insure combustion in enough of the cylinders to cause continuous operation of the engine when the fuel devices are set for the slower speed operations.

This result is accomplished through forming the bearing face 47 of the actuator rock levers 46 in a manner such that the stroke of the pump as affected by the actuating mechanism associated with such face will be increased over that normally obtained by operation of the actuator rock levers 45 when such actuator rock levers are adjusted to cause a fuel injection which produces idle running of the engine.

The faces 47 of the actuator rock levers 46 are curved upwardly at a greater inclination over substantially one half of the bearing length thereof so that the faces 47 of all of the actuator rock levers are substantially the same over one half of their effective operating positions, while during the other half, which is the idling adjustment portion, the rods 33' actuated by the rock levers 46 will be given a quicker and longer stroke than that given the rods actuated by the rock levers 45. Preferably, an actuator rock lever 46 is arranged with the fuel pump actuating device of every third cylinder, so that when set for engine idling every third cylinder will be receiving a sufficient charge of fuel to insure combustion so that the engine will operate continuously even though combustion may fail in some of the other cylinders. It will be understood, however, that the actuator rock levers 46 could be arranged with the fuel pump actuating mechanism associated with other cylinders and still obtain improved running conditions when idling.

In Fig. 5 of the drawings, I have illustrated a chart indicating horizontally the face of the actuator rock lever faces, graduated into ten sections, upon which the rods 33' can be set to cause injection of variable quantities of fuel, and also, illustrating the effective plunger stroke resulting from any range of adjustment on such faces.

The effective plunger injection stroke range is shown as extending from zero to $\frac{7}{32}$ of an inch, zero being the point in the pump at which the plunger closes the passages 28, and the top line indicates the extreme injection position to which the plunger can be moved beyond the passages 28. The line A—B—C indicates the maximum injection stroke of the plunger as operated by the actuator mechanism, while the line D—B—C indicates the same with respect to the actuator rock lever 46. It will be obvious when the actuator rods 33' are positioned on the rock levers 46 between the adjustments from 0 to 5, that is where the increased angular portion of the face 47 extends, that the stroke of the plunger operated thereby will be materially more than the stroke of the plunger operated by means of the actuator rock levers 45. However, when the rods 33' are set between 5 and 10 on the rocker face, the effective stroke of the plungers as operated by both the rock levers 45 and 46 are the same, as shown by line B—C.

With a fuel injection system of the type described, I have found that smoother running of the engine occurs when set for idling speeds, and also that combustion is insured in some of the cylinders irrespective of the condition which normally tends to cause an uncertain fuel delivery during the idling speeds of engine operation. I have also found that this arrangement of fuel feeding is of material assistance in the starting of engines of the Diesel type because it insures that sufficient fuel will be injected to some of the cylinders to cause combustion and rotation of the crankshaft which reciprocates pistons operating in cylinders in which no combustion is taking place and thereby tending to heat up such cylinders so that they will be eventually brought in sooner than if combustion were not taking place in any of the cylinders.

Furthermore, I have found that this arrangement is of an especial advantage with Diesel type of engines utilized for propelling airplanes, especially when the fuel charges have been reduced during gliding of the airplane, because there is an insurance thus obtained that the motor will not cease firing, which under such conditions will be dangerous as it is difficult to bring in cylinders which have ceased firing due to the fact that cool air being drawn into the cylinders, regardless of whether combustion is taking place or not, tends to maintain the combustion chambers in a cool condition which is often prohibitive of their being brought in.

The arrangement for increasing fuel injection in a portion of the cylinders during the idle operation of the engine thus insures continuous operation with a minimum increase of fuel.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

What I claim is:

1. In a nine cylinder radial internal combustion engine, mechanism for injecting fuel charges into the cylinders in desired sequence, said mechanism including means delivering a greater quantity of fuel to every third cylinder in the sequence when set to cause the engine to run at lower speeds.

2. In a multi-cylinder internal combustion engine, fuel injection mechanism for each cylinder, some of said mechanisms including means adapted to deliver larger quantities of fuel to certain cylinders than the other mechanisms are delivering when set to cause the engine to run below a predetermined speed, said mechanisms delivering uniform quantities to all of the cylinders when set to cause the engine to run above the predetermined speed, and a single means for uniformly adjusting the mechanisms to increase or decrease the fuel delivery.

3. In a multi-cylinder internal combustion engine, mechanisms for injecting fuel into the cylinders, and means for adjusting said mechanisms to determine the engine speed, said mechanisms including means distributing relatively uniform fuel charges when set to cause one portion of the engine speed range, and delivering larger fuel charges to certain of the cylinders than to the other cylinders when set to cause another portion of the engine speed range.

4. In a multi-cylinder internal combustion engine, pump plungers for delivering fuel charges to the cylinders, the stroke of said plungers determining the quantity of fuel delivered thereby, actuating mechanisms for said plungers, several of said mechanisms being arranged to cause a longer effective plunger stroke than the other mechanisms in the lower volume delivery portion of the range of their adjustment, and means for simultaneously adjusting said mechanisms to vary the fuel charges.

5. In a multi-cylinder engine, a pump associated with each cylinder for injecting fuel charges therein in desired sequence, said pumps including plungers, and actuating means for each plunger including a rocker lever and adjustable rod means between the lever and the plunger, the faces of said levers with which the rod means engage being formed to cause uniform actuation of all the plungers above a predetermined engine speed in one range of rod adjustment and to cause a longer and earlier effective delivery stroke of some of the plungers than that of the others below the predetermined engine speed in another range of rod adjustment.

6. In a multi-cylinder engine, a pump associated with each cylinder for injecting fuel charges therein in desired sequence, said pumps each including a plunger, actuating mechanism associated with each plunger including a link and a rocker lever having a face with which the link is adjustably associated, the faces of some of said rocker levers with which said links are associated being formed with similar contours different than the faces of the other rocker levers, all of said faces being similar in part, means for actuating said rocker levers in a uniform manner, and means for regulating the position of the links with respect to the rocker lever faces.

7. In a multi-cylinder engine, a fuel injection device including a plunger associated with each cylinder, the stroke of the plungers determining the fuel charge quantity projected from the device, actuating mechanism associated with each plunger including a link and a rocker lever having a curved bearing face against which the link bears, a portion of the bearing faces of some of said rocker levers being formed with a portion having a different contour than others and the other portion of the faces being formed similarly, means for adjusting the links simultaneously in desired relation with the faces of the rocker levers, and a cam for actuating the rocker levers to cause the actuating mechanism to move the plungers in injection strokes in desired sequence.

8. In a multi-cylinder engine, a fuel injection device including a plunger associated with each cylinder, an actuating mechanism including means inducing a longer fuel injection stroke of their associated plungers than the other mechanisms, and cam means associated to operate said mechanisms.

9. In a multi-cylinder engine, a fuel injection device including a plunger associated with each cylinder, adjustable actuating mechanism associated with each plunger, some of said mechanisms including means actuating the associated plungers in a longer fuel dispensing stroke when operated, and cam means associated to operate the mechanisms.

10. In a multi-cylinder engine, a fuel injection device including a plunger associated with each cylinder, an engine driven cam, and an individual actuating mechanism between each plunger and the cam, said mechanisms being adjustable to vary the plunger injection stroke and some of the mechanisms including means effective in the idling stroke range of adjustment to move their plungers further in the fuel displacing direction than the other mechanisms.

11. In a multi-cylinder internal combustion engine, pump plungers for delivering fuel charges to the cylinders, actuating mechanisms for said plungers, several of said mechanisms including means causing a longer effective plunger stroke than the other mechanisms in the lower volume delivery portion of their adjustment range, and means for simultaneously adjusting said mechanisms to vary the fuel charges.

In testimony whereof I affix my signature.

LIONEL M. WOOLSON.